July 31, 1962 M. GREIF ET AL 3,046,605
MANUFACTURE OF TWO-COLOR AND TWO-TONE SOFT SHELL CAPSULES
Filed Jan. 12, 1960

INVENTORS
MARTIN GREIF
LLOYD FRANK HANSEN
BY ERNEST CHU YEN

ATTORNEY

United States Patent Office 3,046,605
Patented July 31, 1962

3,046,605
MANUFACTURE OF TWO-COLOR AND TWO-TONE SOFT SHELL CAPSULES
Martin Greif and Lloyd Frank Hansen, New City, and Ernest Chu Yen, Orangeburg, N.Y., assignors to American Cyanamid Company, New York, N.Y., a corporation of Maine
Filed Jan. 12, 1960, Ser. No. 1,925
2 Claims. (Cl. 18—47.5)

This invention relates to improvements in soft shell capsules in which the two segments from different plastic strips from which the capsule is formed are from different colored plastic strips, and one of these strips possesses all of the separate colorants present in both strips whereby the residual web, after cutting out filled capsules, is used as a component for the casting composition from which at least one of the strips is formed.

More particularly it pertains to two-tone or two-color soft shell capsules, frequently of a gelatin composition, in which the colorants for one of the strips have such characteristics that the web after cutting out the capsules may be added to and form part of the casting composition for such one strip thereby saving the loss of the material in the web.

Soft shell capsules of different colors in different parts have been disclosed in such patents as U.S. 1,134,156, H. R. Planten, Gelatin Capsule, April 6, 1915. The use of machines for forming such soft shell capsules is disclosed in such patents as U.S. 2,663,128, Stirn and Taylor, Method and Machine for Making Capsules, December 22, 1953 and U.S. 2,775,080, Stirn and Taylor, Method of Forming Powdered-and-Liquid Filled Capsules, December 25, 1956. The invention is useful for the colored strips on such machines although it is in no way limited to these particular encapsulation machines.

The use of dyes and pigments and surface coloration of such soft plastic capsules is disclosed in U.S. Patent 2,624,163, Frank E. Stirn, Method of Making Colored Gelatin Capsules, January 6, 1953. Methods of blending components for such capsules are disclosed in U.S. Patent 2,799,591, Michel and Knight, Rapid Preparation of Encapsulation Formula, July 16, 1957 and U.S. Patent 2,799,592, Hansen and Weidenheimer, Rapid Preparation of Encapsulation Mixture, July 16, 1957.

In the past, after cutting plastic capsules from the plastic strips the residual web has considerable plastic material left in the residual web, now containing holes from which the capsule has been cut out. In the past, to re-use such web, it has been necessary that all parts of the web have the same color, and the web was used in mixture with additional primary components to form a new strip.

It has now been found that by suitably choosing the colorant in each of the two strips from which the capsules are made, two different colors may be used providing that all of the components of both colors are a constituent of at least one of the strips, thereby the residual web may be mixed in with additional new plastic strip components, with any required new colorants added, to blend this re-used strip to a color which is desired for one part of the capsule shell.

Generally such plastic capsules are used for medical purposes although such capsules may also be used to contain cleaning fluids, lighter fluids, engine starting fluids, detergents, bleaches, catalysts, dyes, pigments, food flavors, or other constituents which it is desired to separate into small readily ruptured packages. Inasmuch as major use of such capsules has been in the medical field the descriptions will be particularly slanted toward the medical field but it is to be understood that other compositions may be used as the filling for the capsules. Similarly the composition of the capsule shell must be of an edible material if used for medical purposes, in which the capsule is taken internally. A plasticized gelatin composition such as a gelatin-glycerine-water composition has been used the most widely. Other compositions may be used for the shell such as the alginates, or polyvinyl acetates or hydroxyethyl celluloses, or methyl celluloses, or polyacrylamides, or pectins or polyvinyl pyrollidones or mixtures thereof, or with gelatin etc. without in any way departing from the scope of the present invention. Similarly plasticizers other than glycerine may be used including propylene glycol or sorbitol or a polyoxyethylene sorbitol containing from about 4 to 40 polyoxyethylene units, or a polyethylene glycol having a molecular weight from about 200 to about 800 either alone or in mixtures with each other or glycerine. The present invention may be used with any suitable film forming material.

In the color field terminology is at times a bit confused.

In referring to two colored capsules, unless otherwise restricted by context, the two colors differ in one or more of hue, saturation or brightness.

In the present application the term colorant will be used to cover generically any coloring matter, that is a substance which produces a sensation of color. For purposes of the present application, black and white are classed as colors.

A pigment is a finely powdered insoluble colorant which is suspendable in a vehicle. For the present purposes, the vehicle is the strip forming composition and the colorant is classed as a pigment if it is insoluble in such a composition, whether or not it may be soluble in other solvent systems. A lake is an adsorption compound of coloring matter, usually a dye, on aluminum oxide or other metallic oxide, produced by coprecipitating the colorant with the corresponding metallic salts. Such a material is normally insoluble in the web composition and hence for present purposes is to be regarded as a species of pigment. Stains are colorants which are soluble in the solvent under consideration. As here used the term includes dyes. Dyes are colorants which are soluble but which are substantive to a fabric, fiber, or other substrate on which the dye is to be used. For many purposes the term dyes is used to include any soluble coloring matter whether or not it is substantive in a particular system and to such an extent the term may be ambiguous, but as herein used the term stain includes dyes which are soluble in the systems under consideration.

In forming soft plastic capsules the strip constituents are mixed together to form a castable mixture which is cast and conditioned to form a plastic strip from which the capsules are made. Such castable mixture may have odors, or flavoring materials, or preservatives in it, for their own particular purposes. Such additional materials may be used within the scope of the present invention but their use is not a requisite.

In the formation of capsules, stains are in true solution, and if a two-part capsule is formed from two different stain colored plastic strips to form a single unitary soft shell capsule, the stains tend to migrate across the boundary, particularly while the capsule shell is drying, as the capsule shell is in effect a very viscous solution, and accordingly a blurred seal line formed. To secure sharp outlines it is necessary that the stain concentration be the same on both sides of the seal line.

Pigments, being essentially insoluble, and a fine powder, frequently of a particle size of from 0.01 to 1 micron, do not diffuse in the strip material and accordingly may be used in different concentrations on different sides of the seal line.

In accordance with the present invention two-tone capsules are produced by varying the concentration of a pigment on the two sides of the capsule, but while maintaining a single stain concentration.

For instance in a soft gelatin capsule, 0.5% of titanium dioxide as a pigment may be used in one strip and 2% titanium dioxide may be used as a pigment in the other strip and as a result when used with any colored stain, a light and a dark tone is produced. With such a system the residual web may be used as a component for preparing either strip, with suitable modifications in the additions of the other colorants, so that a final capsule having two different tones is produced. In such a capsule, the same colorants appear on each side of the capsule, but in varying proportions.

Two colors can be used, one of which is a component of the other. For example, using one strip of yellow, the other one green, the residual web requires additional blue and such yellow as may be necessary, to produce green. Thus all of the colorants in both strips are present in the green strip and the yellow strip merely has one of the color components.

A blue and green capsule may be produced in which one of the strips is blue and the combined webs are mixed with additional yellow colorant to give a green strip. Similar color series may be set up using any color pair one of which is a constituent of the other, for example using red and yellow as basic colors and orange as a derived color or using a red, blue, purple series.

Either or both of the basic colors can be a mixture of two or more stains or pigments, some of which may be a component of the other basic color system.

Where the capsules are not used internally, color systems may be very varied. For use internally it is necessary that ingestible dyes, stains, or pigments be used. The so called Food, Drug and Cosmetic colors (F. D. and C.) or Drug and Cosmetics Colors (D. and C.) which have met with approval from the United States Government or other controlling government agency for internal usage are of course by far the preferred color components for ingestible capsules. Colorants not presently known to be non-toxic are suitable for use upon adequate proof of non-toxicity. Where the problem of bleeding across the seal line is not of primary concern such colorants may be used even if they are soluble and act as stains.

Where it is desired to prevent bleeding across the seal lines such colorants may be used in the form of lakes, which are essentially insoluble, thus forming pigments which insoluble particles do not migrate across the seal line.

As illustrative of the present invention, the method of making colored capsules is illustrated in the following figures.

*Example 1*

Figure 1:
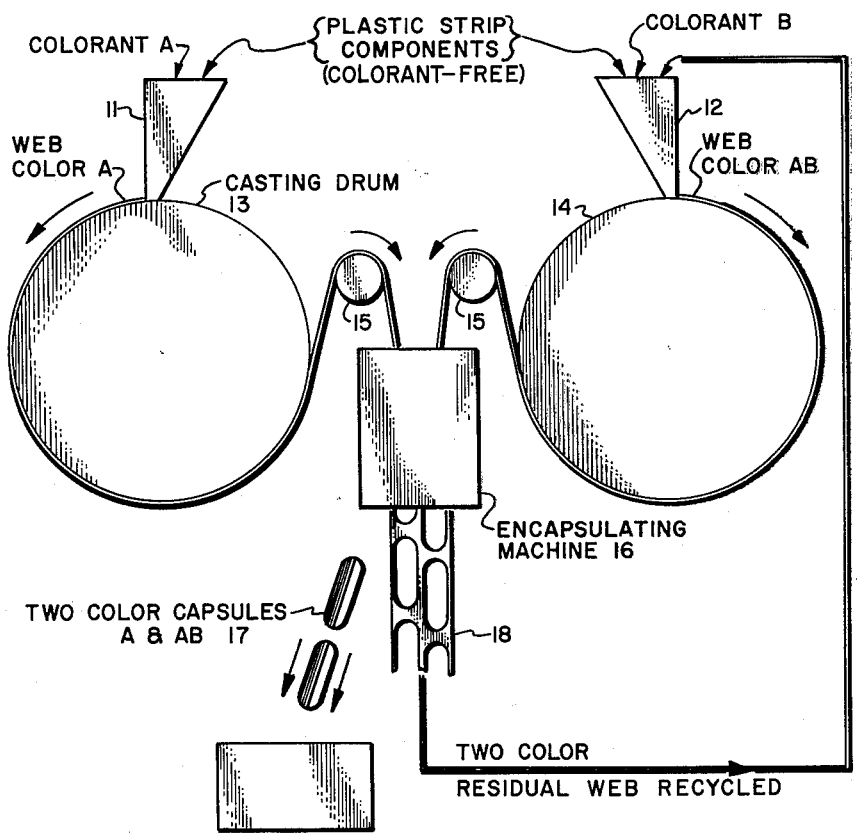
FIGURE 1 shows diagrammatically a web casting and encapsulation machine, and a colorant A added to one web, a colorant B added to the other web and the two color web being recycled to give a web color AB.
Figure 2:
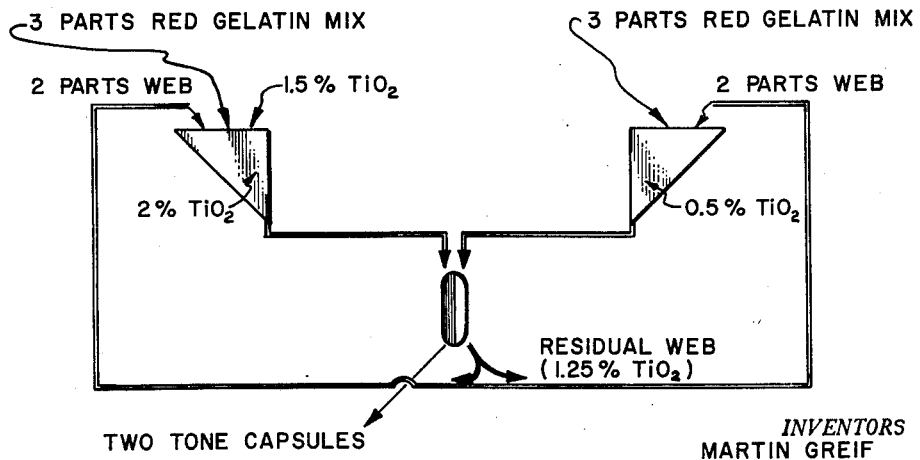
FIGURE 2 shows a two tone red capsule in which a red gelatin mix is used with different proportions of titanium dioxide to give two tones.

For the two-tone capsules the light tone is prepared in accordance with conventional procedures using the following composition:

| | Percent |
|---|---|
| Gelatin | 46.411 |
| Glycerin USP | 14.410 |
| Water, distilled | 33.790 |
| Methyl para-hydroxy-benzoate USP | 0.079 |
| Propyl para-hydroxy-benzoate USP | 0.020 |
| Ethyl vanillin | 0.119 |
| Titanium Dioxide-Glycerin Premix 40/60 | 4.969 |
| F.D. and C. Red No. 2 | 0.100 |
| Beta Naphthol, N.F | 0.102 |

The dark composition for the gelatin web consists of the following:

| | Percent |
|---|---|
| Gelatin | 47.102 |
| Glycerin, USP | 17.110 |
| Water, distilled | 34.221 |
| Methyl para-hydroxy-benzoate USP | 0.081 |
| Propyl para-hydroxy-benzoate USP | 0.020 |
| Ethyl Vanillin | 0.021 |
| Titanium Dioxide-Glycerin Premix 40/60 | 1.242 |
| F.D. and C. Red No. 2 | 0.100 |
| Beta naphthol, N.F | 0.103 |

The mixing procedure set forth in Example 1 of U.S. Patent 2,799,591 was followed. The gelatin, the methyl para-hydroxy-benzoate and the propyl para-hydroxy-benzoate, the F.D. and C. Red No. 2, the beta napthol and the titanium dioxide containing 40% titanium dioxide and 60% glycerin are mixed as the solid components. The solid components are thoroughly mixed and blended while being heated to approximately 78° C. in a vacuum jacketed mixer with the full vacuum being applied to remove any adsorbed gases from the surfaces of the material. The glycerin, ethyl vanillin and the water are mixed and also heated. After the temperature of the liquids reaches about 85° C. and the solids have been blended under vacuum for one half hour, the hot mixture of water and glycerin is drawn rapidly into the agitated mixture of the solids so that solids and the water-glycerin mixture are intimately mixed and blended before there is time for the water to hydrate the gelatin. As the hydration proceeds, the mixture becomes thicker as the gelatin dissolves, giving a final thick colored composition which is effectively free from dissolved and occluded gases and ready for casting in an encapsulation machine.

The same process is used with the dark gelatin using the slightly different composition as shown in the above table.

After the initial batch is prepared and capsules manufactured therefrom, the residual web is used as a constitutent of subsequent batches of the mixture. Three parts of a new red gelatin mixture containing no titanium dioxide is prepared. Additional titanium dioxide to the extent of 1½% of the total weight of a final batch in the form of a 40% titanium dioxide 60% glycerin pre-mixture is added to the batch to be used for the light toned composition (so the final mixture is 2% $TiO_2$) an appropriate deduction being made from the glycerin content so that the final composition is as set forth in the above tables. Additional water is added to compensate for evaporation from the recycled web, as determined by analysis for each run, or experience, about 1.6% water based on total batch weight is required. Two parts of the residual web is then introduced into the mixture, the composition blended, and then used for a subsequent encapsulation run.

The dark-toned strip having low titanium dioxide content does not require the addition of more titanium dioxide. The light-toned strip required the additional 1½% titanium dioxide. When run through encapsulation machines either the new composition or the composition containing the reworked web gives a light and a dark tone to a red capsule without any indication of bleeding across the seal line between the two cut out segments. The stain concentration is identical on both sides of the seal line.

Such a composition is particularly desirable for therapeutic purposes because the same gelatin is being used in a subsequent batch of the same filled material so that if by chance a small proportion of the therapeutically effective materials is trapped in the web, no additional therapeutic agents are introduced as would be the case if the web from one product were mixed into the gelatin in which a different product was to be encapsulated.

Example 2

A two-tone coral capsule is prepared using the following formulations, after encapsulation machines have been in operation:

|  | Dark Side | Light Side |
|---|---|---|
| Two-tone Coral web, Gm | 45,800 | 100,000 |
| Water, Gm | 46,536 | 32,000 |
| Gelatin, Gm | 57,600 | 28,800 |
| Glycerin, Gm | 21,600 | 7,800 |
| Methyl para-hydroxy-benzoate USP, Gm | 99 | 49 |
| Propyl para-hydroxy-benzoate USP, Gm | 25 | 13 |
| Ethyl vanillin, Gm | 148 | 74 |
| Beta napthol, Gm | 126 | 63 |
| TiO₂ Glycerin Premix 40/60 Mix, Gm | 0 | 5,273 |
| FDC Red No. 1, Gm | 124 | 62 |

The coral web indicated in the formulas is a reworked web being reused. This particular formulation for the reworked web goes into the light side and into the dark side. The web from one run is used in the next batch.

Example 3

Using an encapsulation machine as diagrammatically indicated in FIGURE 1 two color capsules are prepared following the procedures of Example 1. The lakes are milled with about 25% lake, 35% glycerine, and 45% water to give a smooth dispersion, then mixed with the remainder of the glycerin and water, and the liquid system heated, the system otherwise following Example 1.

The two gelatin compositions for casting the strips were prepared having the following composition:

|  | Yellow | Green |
|---|---|---|
| Gelatin, Gm | 57,600 | 57,600 |
| Glycerin, Gm | 20,688 | 20,688 |
| Water, Gm | 40,800 | 40,800 |
| Methyl para-hydroxy-benzoate, Gm | 96 | 96 |
| Propyl para-hydroxy-benzoate, Gm | 24 | 24 |
| Ethyl vanillin, Gm | 144 | 144 |
| TiO₂ Glycerin Premix 40/60, Gm | 3,024 | 3,024 |
| D and C Yellow #5 Lake, Gm | 1,200 | 600 |
| D and C Blue #1 Lake, Gm |  | 912 |

After preparing two color yellow-green capsules, the residual web is reused in the composition for casting the green strip, by weighing the residual web, deducting for the weight of each web component from the batch contents, mixing the new components for a second batch, then after hot mixing the new components, the residual web is added, the composition blended, then used for a second batch of yellow-green capsules.

If two-thirds by weight of web is added, then no additional yellow lake is required for the green color composition.

The green batch then contains:

|  | Grams |
|---|---|
| Gelatin | 19,200 |
| Glycerin | 6,896 |
| Water (including replacement for evaporation) | 17,600 |
| Methyl para-hydroxy-benzoate | 32 |
| Propyl para-hydroxy-benzoate | 8 |
| Ethyl vanillin | 48 |
| TiO₂ glycerin premix 40/60 | 1,008 |
| D and C Blue #1 lake | 152 |
| Residual web | 78,488 |

Example 4

Similarly, a two color red-orange capsule is prepared having the following strip compositions:

|  | Red | Orange |
|---|---|---|
| Gelatin, Gm | 115,200 | 115,200 |
| Glycerin, Gm | 43,200 | 43,200 |
| Water, Gm | 83,760 | 83,760 |
| Titanium dioxide, Gm | 2,480 | 2,480 |
| D and C Red #2 Lake, Gm | 2,480 | 1,240 |
| D and C Yellow #5 Lake, Gm |  | 1,240 |

The red-orange two color strip is used as a component for a second batch of orange gelatin casting compositioin, as indicated in Example 3.

Example 5
TWO SHADE VIOLET

Using the basic gelatin composition for a 250 kilogram batch, and the process of Example 1, the color components chosen are:

|  | Reddish Violet | Bluish Violet |
|---|---|---|
| D and C Blue #1 Lake, Gm | 800 | 1,600 |
| D and C Red #2 Lake, Gm | 1,600 | 800 |

For a second batch using 50% by weight of recovered web, the following are added to new casting batches of 250 kilograms:

| 50% Recovered Web | To Make Reddish Violet | Bluish Violet |
|---|---|---|
| Two-shade violet web, Gm | 125,000 | 125,000 |
| D and C Blue #1 Lake, Gm | 200 | 1,000 |
| D and C Red #2 Lake, Gm | 1,000 | 200 |

The exact colors being used are a matter of choice. A large selection is available so that a large number of different therapeutic products can be identified rapidly by color. Such identification is useful in manufacturing and retailing operations to enable instant differentiation between products.

A compartmented casting hopper may be used with adjacent integrated segments of a single strip being of different colors. The two compositions blend together before the strip hardens, thereby permitting the cut out segment from each strip to be of two or more colors. Annular rings, checkered colors, etc. are thus produced, without any seam breaks being visible.

Other analogous modifications will suggest themselves to those skilled in the art, which modifications are within the scope of the appended claims.

We claim:

1. A method of forming two-color soft gelatin capsules and reworking the web which comprises (a) mixing a first castable gelatin composition containing a dissolved stain which tends to bleed across a seal line of a capsule and an insoluble pigment; (b) mixing a second castable gelatin composition containing the same concentration of the same stain as said first castable gelatin composition, and a different concentration of the same insoluble pigment as said first castable gelatin composition; (c) forming each said composition into a strip, forming soft gelatin capsules from the strips, such that each capsule is cut out from part of each of said castable gelatin compositions, and a sealed together, combined, residual web remains containing part of each of said castable gelatin compositions; and (d) mixing a subsequent batch of each of said first castable gelatin composition and said second castable gelatin composition, each such subsequent batch containing part of the combined residual web, and such new quantities of said stain and said pigment that the resulting batches are of the same composition as the initial first castable gelatin composition and the initial second gelatin composition.

2. A method of forming a two-tone, red capsule from gelatin composition comprising (a) preparing a first castable gelatin composition containing 0.5% titanium dioxide from two parts residual web (including a minor amount of water added to compensate for evaporation) having an average titanium dioxide content of 1.25% by weight, and three parts of fresh, red gelatin mix; (b) preparing a second castable gelatin composition containing 2.0% titanium dioxide from two parts residual web (including a minor amount of water added to compensate for evaporation) having an average titanium content of 1.25% by weight, three parts of fresh red gelatin mix, and 1.5% by weight (of the total of five parts) of titanium dioxide; (c) forming each said composition into a strip, forming soft gelatin capsules from the strips, such that each capsule is cut out from part of each of said castable gelatin compositions, and a sealed together, combined, residual web remains containing equal portions of each of said castable gelatin compositions, and an average of 1.25% by weight of titanium dioxide and reusing said residual web in preparing subsequent batches of gelatin composition.

References Cited in the file of this patent

UNITED STATES PATENTS

| | | |
|---|---|---|
| 462,990 | Oppenheimer | Nov. 10, 1891 |
| 1,134,136 | Planten | Apr. 6, 1915 |
| 2,305,658 | Anderson | Dec. 22, 1942 |
| 2,525,864 | Carter | Oct. 17, 1950 |
| 2,663,129 | Donofrio | Dec. 22, 1953 |
| 2,690,038 | Stirn et al. | Sept. 28, 1954 |
| 2,770,571 | Vance | Nov. 13, 1956 |
| 2,928,128 | Carlson et al. | Mar. 15, 1960 |